US008362943B2

(12) United States Patent
Jacobs et al.

(10) Patent No.: US 8,362,943 B2
(45) Date of Patent: Jan. 29, 2013

(54) RADAR REGISTRATION USING TARGETS OF OPPORTUNITY

(75) Inventors: Mark H. Jacobs, Simi Valley, CA (US); Yair Alon, Thousand Oaks, CA (US); Joseph H. Geiger, Westlake Village, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 555 days.

(21) Appl. No.: 12/803,680

(22) Filed: Jul. 2, 2010

(65) Prior Publication Data
US 2012/0001793 A1 Jan. 5, 2012

(51) Int. Cl.
 *G01S 13/74* (2006.01)
(52) U.S. Cl. ............... 342/29; 342/32; 342/36; 342/37; 342/59
(58) Field of Classification Search ............ 342/29–32, 342/36–38, 59, 107, 113, 133, 139–140, 342/146–147
See application file for complete search history.

(56) References Cited

U.S. PATENT DOCUMENTS

| | | | | |
|---|---|---|---|---|
| 3,111,665 A * | 11/1963 | Werner et al. | ............... | 342/125 |
| 3,579,237 A * | 5/1971 | Steingart et al. | ............ | 342/147 |
| 5,051,752 A * | 9/1991 | Woolley | .................. | 342/151 |
| 5,344,105 A * | 9/1994 | Youhanaie | .................. | 244/3.14 |
| 5,519,618 A * | 5/1996 | Kastner et al. | ................ | 701/120 |
| 6,225,942 B1 * | 5/2001 | Alon | ............................. | 342/59 |
| 6,356,229 B1 | 3/2002 | Schneider | | |
| 6,922,493 B2 * | 7/2005 | Stanek | ........................ | 382/293 |
| 7,719,461 B1 * | 5/2010 | Mookerjee et al. | ............ | 342/95 |
| 8,054,215 B2 * | 11/2011 | Abbett et al. | ................... | 342/37 |
| 2003/0169945 A1 * | 9/2003 | Stanek | ........................ | 382/293 |
| 2009/0167591 A1 * | 7/2009 | Abbett et al. | ................... | 342/37 |
| 2009/0238426 A1 * | 9/2009 | Fear et al. | ..................... | 382/128 |
| 2012/0001793 A1 * | 1/2012 | Jacobs et al. | ................. | 342/146 |

OTHER PUBLICATIONS

Pan Jiang Huai; He Jia Zhou; , "On-line absolute sensor registration in 3-D radars networking," Cross Strait Quad-Regional Radio Science and Wireless Technology Conference (CSQRWC), 2011 , vol. 2, no., pp. 1085-1089, Jul. 26-30, 2011.*
Li, I.T.; Georganas, J.; , "Multi-target multi-platform sensor registration in geodetic coordinates," Information Fusion, 2002. Proceedings of the Fifth International Conference on , vol. 1, no., pp. 366-373 vol. 1, 2002.*
Rhodes, S.; , "Real time detection and compensation of registration errors in a network of radars," Multifunction Radar and Sonar Sensor Management Techniques (Ref. No. 2001/173), IEE , vol., no., pp. 4/1-4/7, Nov. 26, 2001.*
Xiong Wei; Pan Xu-dong; Peng Ying-ning; , "Sensor registration technique for passive location system," Radar Conference, 2009 IET International , vol., no., pp. 1-4, Apr. 20-22, 2009.*

* cited by examiner

*Primary Examiner* — John B Sotomayor
(74) *Attorney, Agent, or Firm* — Carmen Patti Law Group, LLC

(57) ABSTRACT

A method for registering a radar system. The method includes obtaining first values for a location of a target relative to the radar system using radar system initiated signals, obtaining geo-referenced location data for and from the target, obtaining second values for the location of the target relative to the radar system using the geo-referenced location data, computing location registration bias errors for the radar system using the first and second values, and registering the radar system using the computed location registration bias errors.

31 Claims, 11 Drawing Sheets

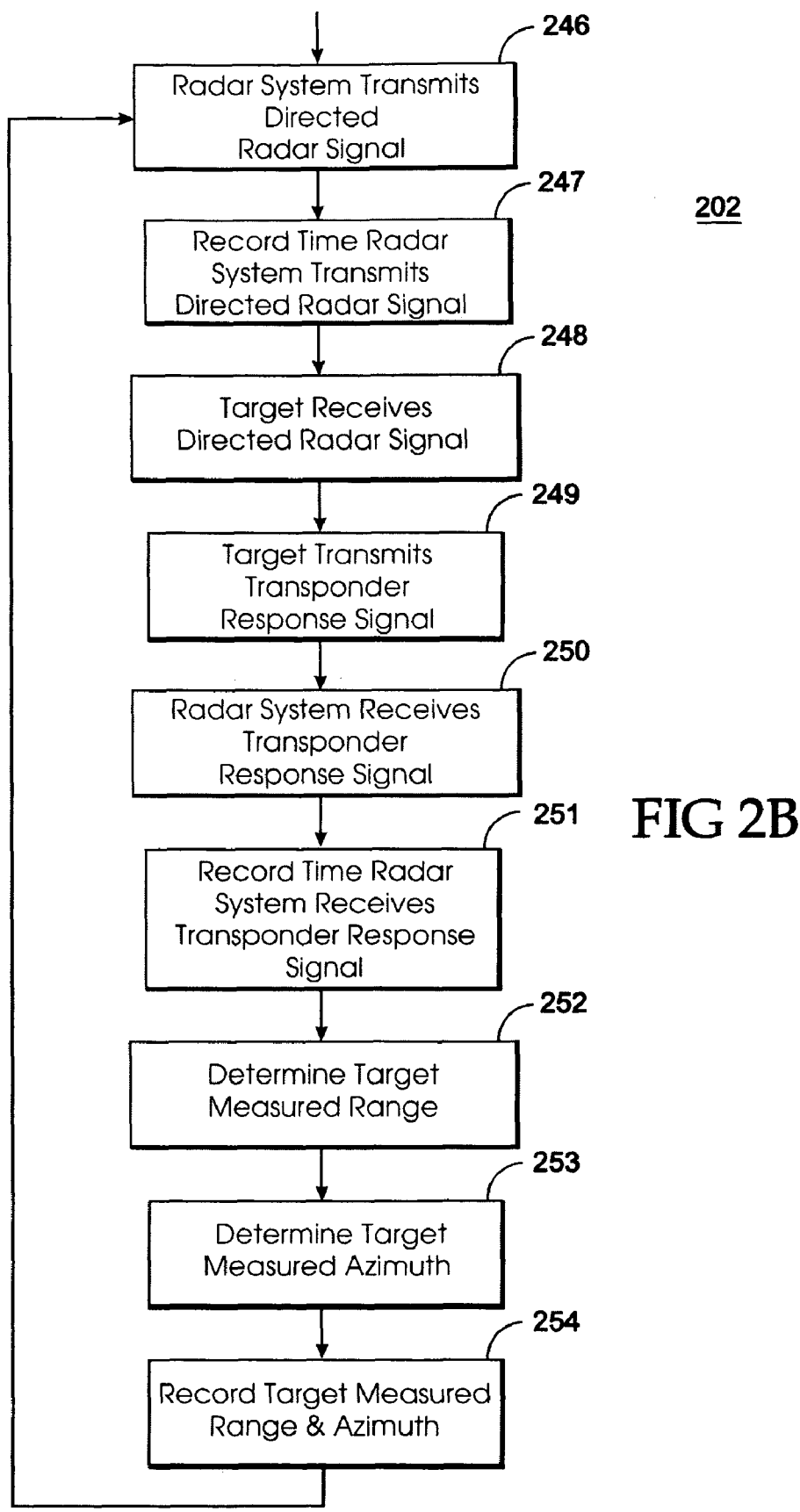

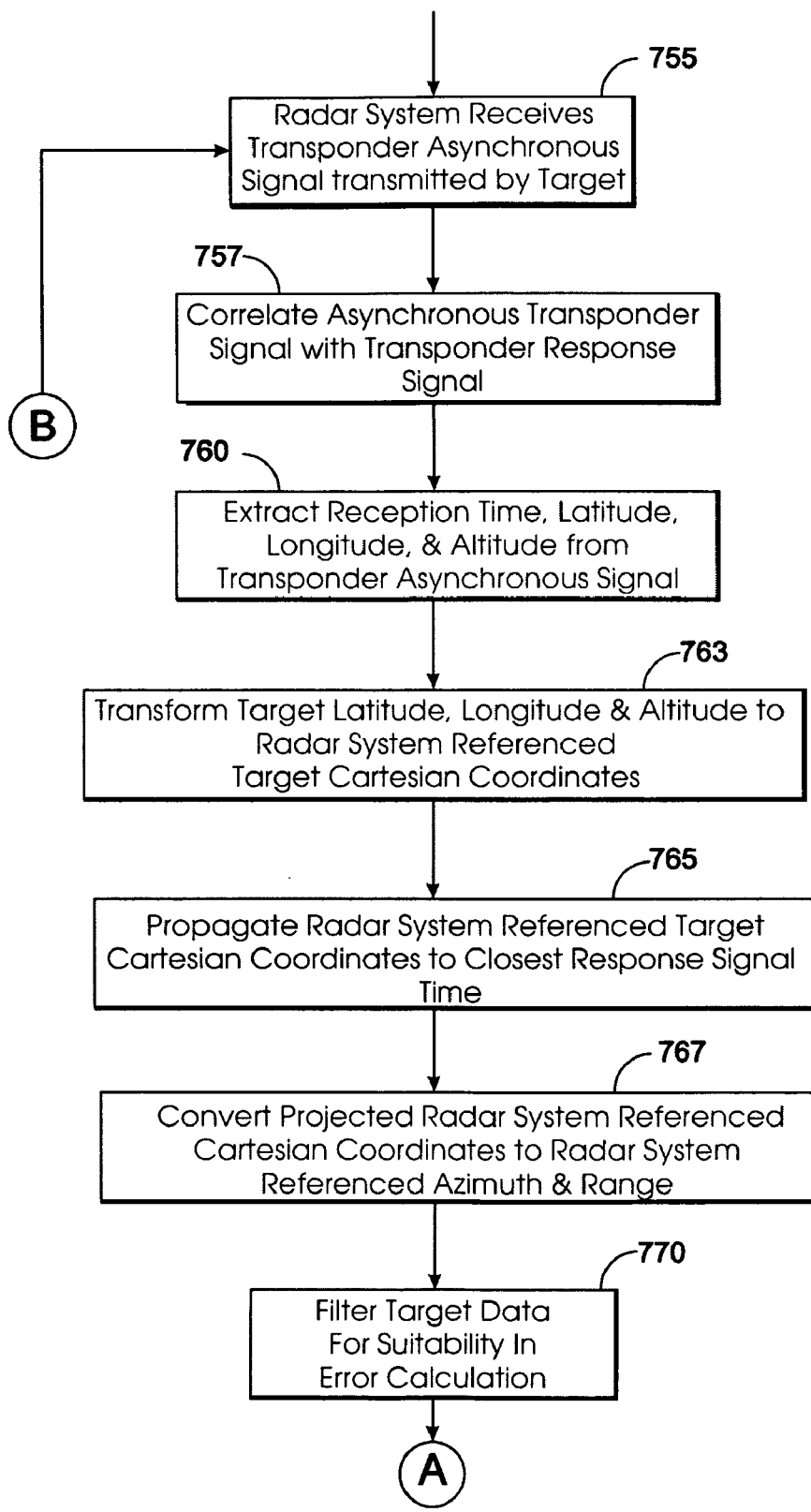

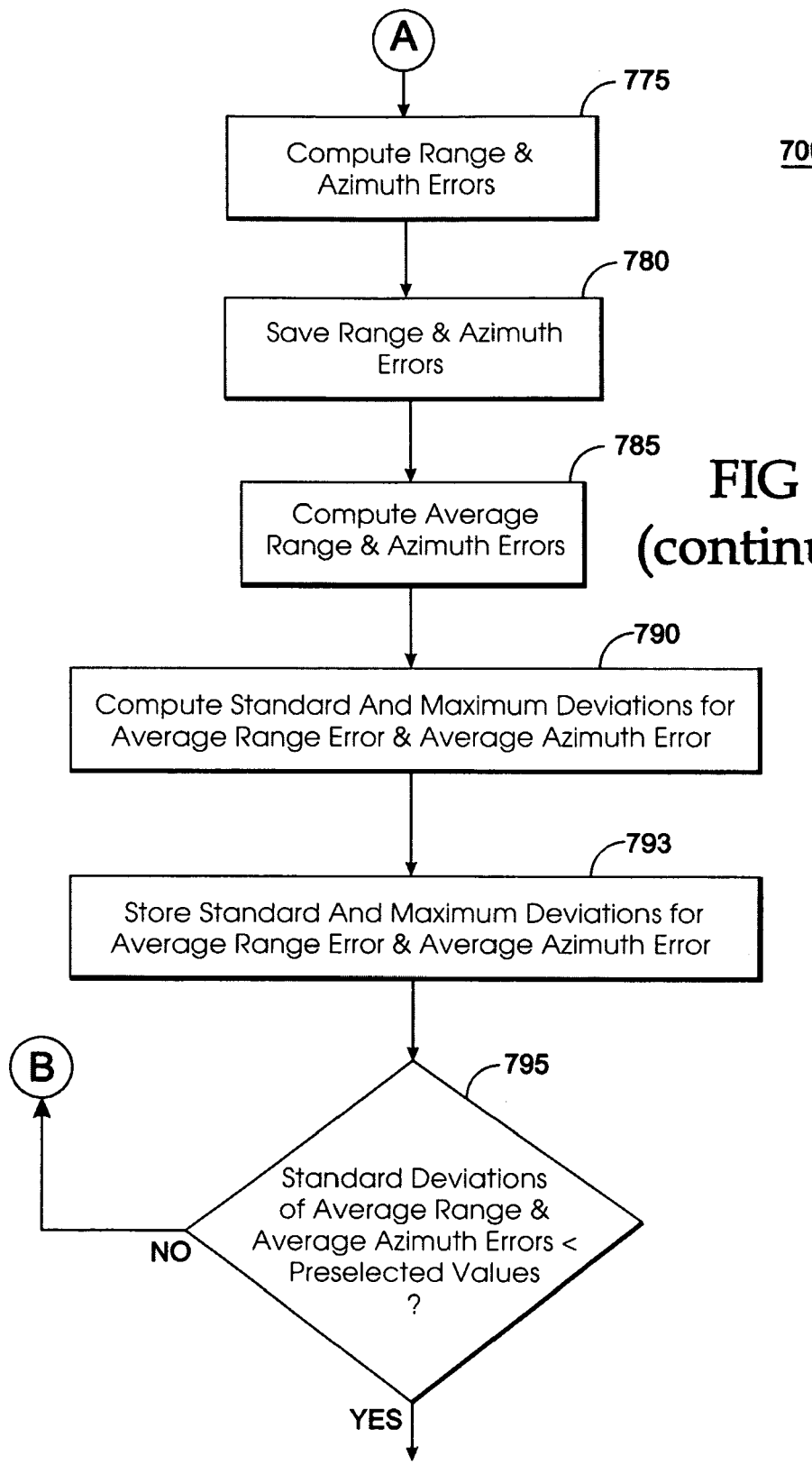

RADAR REGISTRATION USING TARGETS OF OPPORTUNITY

BACKGROUND

The ability to accurately locate the position of an aircraft detected by a radar system is an important capability of such systems. In particular, due to the speed at which modern aircraft operate, it is especially important for mid-air collision avoidance and in the control of landing approaches in inclement weather. The control of aircraft in a specified region of air space is referred to as air traffic control (ATC).

ATC systems often utilize a system referred to as the air traffic control radar beacon system (ATCRBS) which is used by ATC to enhance surveillance radar monitoring and separation of air traffic. ATCRBS assists ATC surveillance radars by acquiring information about the aircraft being monitored and providing this information to the radar controllers. The controllers can then use the information to identify radar returns from aircraft which are referred to as targets and to distinguish those returns from ground clutter. The aircraft's information is contained in the returned signal from a transponder located on the aircraft.

An ATC ground station usually includes two radar systems. The first is the primary surveillance radar (PSR). The second is the secondary surveillance radar (SSR). The primary surveillance radar operates by transmitting radio pulses, listening for any reflections from aircraft in its detection zone, and measuring the time between those transmitted pulses and their reflected pulses. The SSR depends on a cooperating transponder installed on an aircraft being tracked. The transponder emits a signal when it receives a signal from the secondary radar. The transponder can send encoded information about the aircraft, such as identity and altitude.

Errors in the locations of targets by radar systems such as ATC systems are compensated for by registration techniques. Current processes for accurately registering a radar system use an accurately surveyed transponder, referred to as a Position Adjustable Range Reference Orientation Transponder (PARROT). By comparing measured PARROT range and azimuth values to values derived from the surveyed position of the PARROT and the surveyed position of the radar, a bias or offset error in the radar system between the two can be calculated and then compensated for. The process involves measuring the PARROT range and azimuth data over multiple scans and applying proper filtering to achieve the required registration accuracy.

BRIEF DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIG. 2B is a flowchart of another method for obtaining measured target range and azimuth data for the directed mode registration of the radar system using the target of opportunity of FIG. 1.

FIG. 7 is a flowchart of a method for the asynchronous mode registration of a radar system using the target of opportunity of FIG. 5.

DETAILED DESCRIPTION

Figure 1:
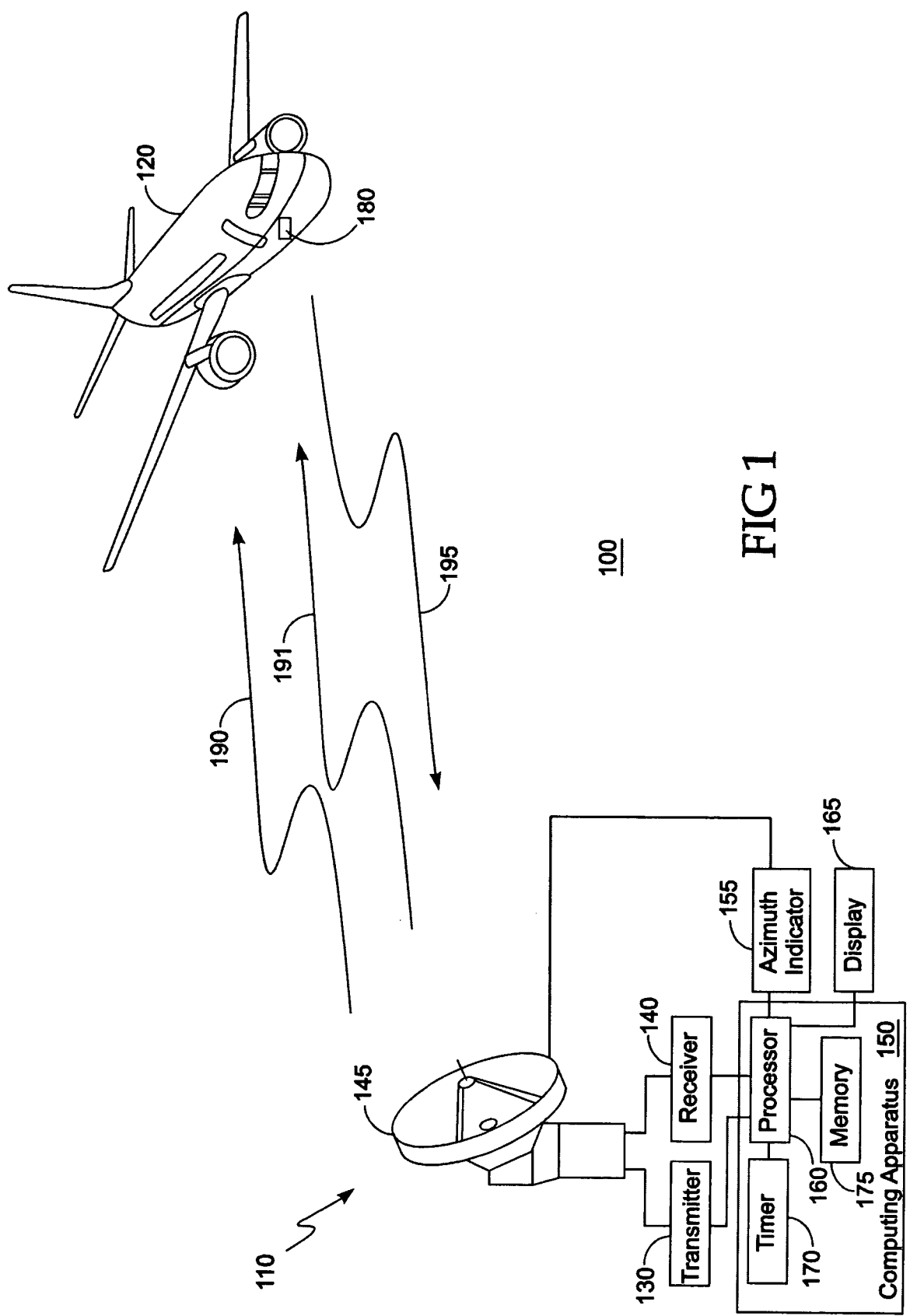
FIG. 1 is a drawing of a registration system for a directed mode registration of a radar system using a target of opportunity as described in various representative embodiments.

As shown in the drawings for purposes of illustration, novel techniques are disclosed herein for accurate radar registration using targets of opportunity that are detected by the radar. Previously, to obtain sufficiently accurate range and azimuth bias data an accurately located Position Adjustable Range Reference Orientation Transponder (PARROT) was used. Techniques disclosed herein eliminate the need for the PARROT in the registration process. This elimination results in reduced radar installation costs and provides registration capability in tactical situations where a PARROT may not be available or cannot be optimally sited.

In particular, the de-facto standard for Monopulse Secondary Surveillance Radar (MSSR) range and accuracy bias performance is found in Eurocontrol Mode S Station Functional Specification (SUR/MODES/EMS/SPE-01). This document specifies a Range Accuracy of $\frac{1}{128}$ NM (~47 ft) and an Azimuth Accuracy of 0.022 degrees. Mode S which stands for "mode select" is a discrete selective interrogation radar rather than a general broadcast system. Mode S transponders on the aircraft ignore interrogations not addressed with their unique identity code which reduces channel congestion.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Targets of opportunity can be employed for the radar system registration process when using Mode S. Monopulse Secondary Surveillance Radar (MSSR) has the capability to receive aircraft latitude, longitude and altitude information, either through a directed interrogation or via an Automatic Dependent Surveillance Broadcast (ADS-B). By converting the target reported latitude/longitude geographical data to radar system polar coordinates, the error between the measured (range and azimuth) and target reported (latitude/longitude) positions can be calculated and the registration correction value extracted. However, both radar system measured and target reported position data samples can contain significant random errors. By taking multiple samples over a number of scans for all qualified targets of opportunity, and by applying proper filtering, the random error is significantly reduced yielding range and azimuth registration correction values that can meet accuracy requirements.

A list of the advantages and disadvantages of the directed interrogation method for the registration of a radar system is shown in Table 1.

TABLE 1

Advantages and Disadvantages of the Directed Interrogation Method

| Advantages | Disadvantages |
|---|---|
| Simpler system configuration | Higher interrogation rate |
| No separate ADS-B antenna/receiver required | Additional interrogations required to acquire target Lat/Long |
| Greater accuracy | |
| No correlation of Lat/Long data to radar-measured range/azimuth required | |
| No time alignment required | |
| Faster | |
| Fewer corrupted samples due to directional antenna being less susceptible to FRUIT than ADS-B Omni antenna | |

In the directed Mode S Ground-initiated Comm-B (GICB) interrogation mode, target position data is transferred to its transponder from its on-board global positioning satellite/inertial navigation system (GPS/INS system) and stored in Comm-B Data Selector (BDS) registers 0,5 and/or 5,1 and 5,2. Comm-B is a Mode S standard length (56-bit) communication protocol which is used to transmit data from the transponder to the interrogator. Once the interrogator acquires the aircraft and establishes it on its Mode S roll call schedule, it requests a downlink of the Latitude and Longitude data contained in the desired register(s).

The target latitude, longitude and altitude data is associated with the measured range and azimuth position. However, both data sources may provide erroneous information. The SSR data may contain registration bias errors and random measurement errors. The GICB data may contain errors due to lack of GPS data, INS drift, and/or latency in reporting.

To compensate for the errors associated with each individual sample, the target latitude/longitude position is converted to radar system referenced polar coordinates where it is compared to the radar system measured position. This comparison yields separate range and azimuth error estimates. These estimates are filtered/averaged over time providing increasingly accurate range and azimuth corrections that, when applied to the target position, can meet accuracy requirements.

In a representative example, upon receipt of the proper Mode S interrogation signal (standard or Comm-A requesting information in transponder BDS registers 0,5 and/or 5,1 and 5,2), the aircraft, if capable, will respond with Comm-B messages that contain the compact position report (CPR) position found in BDS 0,5 or coarse target position found in Comm-B Data Selector (BDS) 5,1 and fine target position found in BDS 5,2. Concurrently, the MSSR will measure and store the target's range and azimuth. The format of the data contained in the message MB fields for BDS register 0,5 is shown in Table 2 and for BDS registers 5,1 and 5,2 in Table 3. The minimum data update rate for register 0,5 is 0.2 seconds. The minimum update rate for registers 5,1 and 5,2 is 0.5 seconds (reference ICAO Annex 10, Volume III, pg 5-64 and 5-65).

TABLE 2

BDS 0,5 Message Format

| BDS Register | Bits | Data Type | Remarks |
|---|---|---|---|
| 0,5 | 1 to 5 | Format Type Code (MSB to LSB) | 0: No position information<br>1-4: Identification (N/A)<br>5-8: Surface Position (N/A)<br>9: $\mu < 3$ m<br>10: $3$ m $\leq \mu < 10$ m, Baro altitude<br>11: $10$ m $\leq \mu < 0.05$ NM, Baro altitude<br>12: $0.05$ NM $\leq \mu < 0.1$ NM, Baro altitude<br>13: $0.1$ NM $\leq \mu < 0.25$ NM, Baro altitude<br>14: $0.25$ NM $\leq \mu < 0.5$ NM, Baro altitude<br>15: $0.5$ NM $\leq \mu < 1.0$ NM, Baro altitude<br>16: $1.0$ NM $\leq \mu < 5.0$ NM, Baro altitude<br>17: $5.0$ NM $\leq \mu < 10.0$ NM, Baro altitude<br>18: $\mu \geq 10.0$ NM<br>19: Velocity (N/A)<br>20: $\mu < 3$ m, GNSS Height<br>21: $\mu < 10$ m, GNSS Height<br>22: $\mu \geq 25$ m, GNSS Height<br>23-31: Reserved<br>$\mu = 95\%$ containment radius, horizontal position error |
| | 6 to 7 | Surveillance Status | 0: No condition information<br>1: Permanent alert (emergency condition)<br>2: Temp alert<br>3: SPI condition |
| | 8 | Single Antenna Flag | 0: dual transmit antenna system<br>1: single transmit antenna |
| | 9 to 20 | Altitude | Specified by format type code: Altitude code as specified in 3.1.2.6.5.4 of ICAO Annex 10 Vol. IV, with M-bit removed. GNSS height |
| | 21 | Time | Valid for Format codes 9, 10, 20 and 21 only.<br>0: time of applicability not synchronized to UTC<br>1: time of applicability synchronized to UTC |
| | 22 | CPR Format | Indicated CPR formatting type<br>0: even format CPR coding<br>1: odd format CPR coding |
| | 23 to 39 | Encoded Latitude | CPR airborne format |
| | 40 to 56 | Encoded Longitude | CPR airborne format |

TABLE 3

BDS 5,1 and 5,2 Message Formats

| BDS Register | Bits | Data Type | Remarks |
|---|---|---|---|
| 5,1 | 1 | Status | Set to 0 if any of the three parameters reported are invalid. |
| | 2 | Latitude Sign | 0 = North, 1 = South. |

TABLE 3-continued

BDS 5,1 and 5,2 Message Formats

| BDS Register | Bits | Data Type | Remarks |
|---|---|---|---|
|  | 3 to 21 | Coarse Latitude (MSB to LSB) | Range −180 to +180, MSB 90 degrees, LSB 360/1048576 degrees. 2's compliment. (Only +90 to −90 are actually used) |
|  | 22 | Longitude Sign | 0 = East, 1 = West. |
|  | 23 to 41 | Coarse Longitude (MSB to LSB) | Range −180 to +180, MSB 90 degrees, LSB 360/1048576 degrees. 2's compliment. |
|  | 42 | Altitude sign | 0 = positive, 1 = negative |
|  | 43 to 56 | Pressure Altitude (MSB to LSB) | From −1000 feel to 126,752 feet, LSB 8 feet |
| 5,2 | 1 | Status | Set to 0 if any of the three parameters reported are invalid. (Identical to register 5,1) |
|  | 2-5 | FOM/ Source coding | 0 = FOM > 10 NM or unknown accuracy<br>1 = FOM 10 NM, pressure altitude<br>2 = FOM 4 NM, pressure altitude<br>3 = FOM 2 NM, pressure altitude<br>4 = FOM 1 NM, pressure altitude<br>5 = FOM 0.5 NM, pressure altitude<br>6 = FOM 0.3 NM, pressure altitude<br>7 = FOM 0.1 NM, pressure altitude<br>8 = FOM 0.05 NM, pressure altitude<br>9 = FOM 30 m, pressure altitude<br>10 = FOM 10 m, pressure altitude<br>11 = FOM 3 m, pressure altitude<br>12 = FOM 30 m, GNSS height<br>13 = FOM 10 m, GNSS height<br>14 = FOM 3 m, GNSS height<br>15 = Reserved |
|  | 6 to 23 | Fine Latitude (MSB to LSB) | Range 0 to +180/128, MSB 90/128 degrees, LSB 90/16777216 degrees. 2's compliment. |
|  | 24 to 41 | Fine Longitude (MSB to LSB) | Range 0 to +180/128, MSB 90/128 degrees, LSB 90/16777216 degrees. 2's compliment. |
|  | 42 | Altitude sign | 0 = positive, 1 = negative |
|  | 43 to 56 | Altitude (MSB to LSB) | From −1000 feel to 126,752 feet, LSB 8 feet |

FIG. 1 is a drawing of a registration system 100 for a directed mode registration of a radar system 110 using a target 120 of opportunity as described in various representative embodiments. In FIG. 1, the registration system 100 comprises the radar system 110 and the target 120 of opportunity. The radar system 110 comprises a transmitter 130, a receiver 140, an antenna 145, a computing apparatus 150, an azimuth indicator 155 and a display 165. The computing apparatus 150 comprises a processor 160 which could be a computer processor 160, a timer 170 and a memory 175. The target 120 of opportunity comprises a transponder 180. In the representative embodiment of FIG. 1, the antenna 145 is coupled to the transmitter 130, the receiver 140 and to the azimuth indicator 155. The transmitter 130 is further coupled to the processor 160; the receiver 140 is further coupled to the processor 160; and the processor 160 is further coupled to the azimuth indicator 155, to the display 165, to the timer 170 and to the memory 175.

In operation, the transmitter 130 of the radar system 110 transmits non-directed radar signals 191 via the antenna 145 which are received by the transponder 180 located on the target 120. The timer 170 records the time each non-directed radar signal 191 is transmitted. Following reception of each non-directed radar signal 191 by the transponder 180, it transmits a transponder response signal 195 which is detected by the receiver 140 via the antenna 145. Upon reception of each transponder response signal 195, the timer 170 record the time of reception. A range to the target 120 is measured by the processor 160 based on the time a given non-directed radar signal 191 was transmitted by the transmitter 130 and the time its corresponding transponder response signal 195 was received by the receiver 140. An azimuth to the target is measured by knowing the azimuth at which the antenna 145 is pointing at the time that each transponder response signal 195 is received by the receiver 140.

Interleaved with the non-directed radar signals 191, the transmitter 130 of the radar system 110 transmits a directed radar signal 190 via the antenna 145 which is received by the transponder 180 located on the target 120. The transponder 180 then transmits a transponder response signal 195 which is detected by the receiver 140 via the antenna 145. Target reported values for the range and azimuth of the target 120 relative to the radar system are obtained from computations based on information received in the transponder response signal 195 from the target 120. Information (latitude, longitude, and altitude of the target 120) received in the transponder response signal 195 can comprise Global Positioning System (GPS) location information, inertial navigation system (INS) location information, and/or other appropriate location information for the target 120. By converting the target 120 reported latitude/longitude geographical data to radar polar coordinates, the error between the measured (range and azimuth) and target 120 reported (latitude/longitude) positions can be calculated and registration correction values for range and azimuth for the radar system 110 extracted. Range and azimuth values compensated respectively by the range and azimuth error bias values and/or target 120 location relative to the radar system 110 can be displayed on the display 165.

Figure 2A:
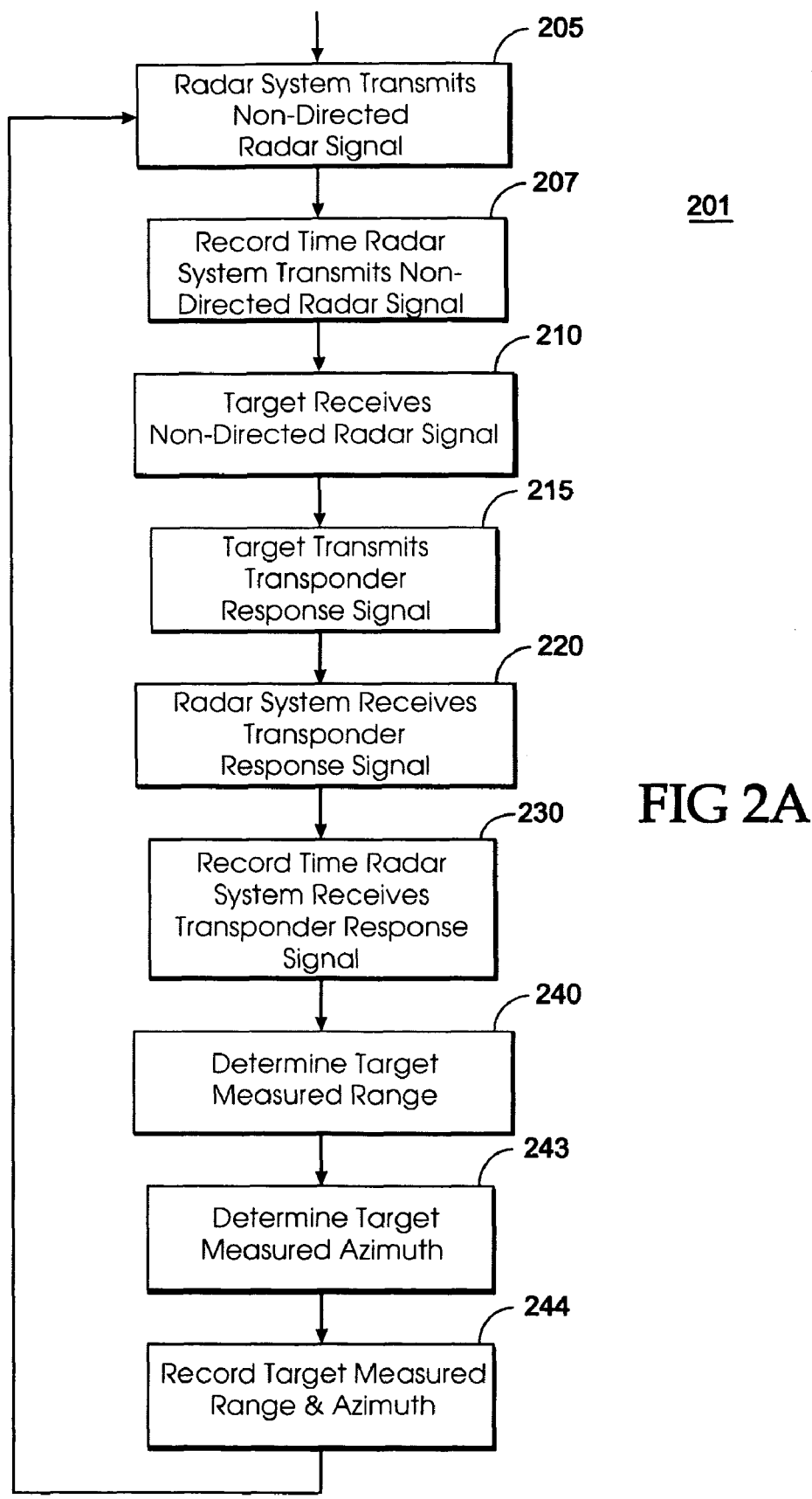
FIG. 2A is a flowchart of a method for obtaining measured target range and azimuth data for the directed mode registration of the radar system using the target of opportunity of FIG. 1.

FIG. 2A is a flowchart of a method 201 for obtaining measured target 120 range and azimuth data for the directed mode registration of the radar system 110 using the target 120 of opportunity of FIG. 1. In block 205, of FIG. 2A, the radar system 110 transmits a non-directed radar signal 191 that includes instructions to the target(s) that receive the signal to respond with a transponder response signal 195. Block 205 then transfers control to block 207.

In block 207, the time that the non-directed radar signal 191 is transmitted is recorded. Block 207 then transfers control to block 210.

In block 210, the target 120 receives the non-directed radar signal 191. Block 210 then transfers control to block 215.

In block 215, the target 120 transponder 180 transmits a transponder response signal 195 in response to the non-directed radar signal 191 received by the transponder 180. Block 215 then transfers control to block 220.

In block 220, the radar system 110 receives the transponder response signal 195 from the target 120. Block 220 then transfers control to block 230.

In block 230, the time that the transponder response signal 195 is received by the radar system 110 receiver 140 is recorded. Block 230 then transfers control to block 240.

In block 240, the time that the non-directed radar signals 191 is transmitted and the time that the transponder response signal 195 is received by the radar system 110 receiver 140 are used to determine the target 120 measured range $R_m$. Block 240 then transfers control to block 243.

In block 243, a measured azimuth $Az_m$ from the radar system 110 to the target 120 is obtained from the direction in which the antenna 145 of the radar system 110 is pointing at the time that the transponder response signal 195 is received by the radar system 110 receiver 140. Block 243 then transfers control to block 244.

In block 244, the measured range $R_m$ and azimuth $Az_m$ from the radar system 110 to the target 120 is recorded in the memory 175. Block 244 then transfers control to block 205 wherein subsequently either the same target 120 or a different target 120 could receive the non-directed radar signal 191 in block 210.

FIG. 2B is a flowchart of another method 202 for obtaining measured target range and azimuth data for the directed mode registration of the radar system 110 using the target 120 of opportunity of FIG. 1. In block 246, of FIG. 2B, the radar system 110 transmits a directed radar signal 190 that includes instructions to the target 120 to which it is directed to respond with a transponder response signal 195. Block 246 then transfers control to block 247.

In block 247, the time that the directed radar signal 190 is transmitted is recorded in the memory 175. Block 247 then transfers control to block 248.

In block 248, the target 120 receives the directed radar signal 190. Block 248 then transfers control to block 249.

In block 249, the target 120 transponder 180 transmits a transponder response signal 195 in response to the directed radar signal 190 received by the transponder 180. Block 249 then transfers control to block 250.

In block 250, the radar system 110 receives the transponder response signal 195 from the target 120. Block 250 then transfers control to block 251.

In block 251, the time that the transponder response signal 195 is received by the radar system 110 receiver 140 is recorded in the memory 175. Block 251 then transfers control to block 252.

In block 252, the time that the directed radar signal 190 is transmitted and the time that the transponder response signal 195 is received by the radar system 110 receiver 140 is used to determine the target 120 measured range $R_m$. Block 252 then transfers control to block 253.

In block 253, a measured azimuth $Az_m$ from the radar system 110 to the target 120 is obtained from the direction in which the antenna 145 of the radar system 110 is pointing at the time that the transponder response signal 195 is received by the radar system 110 receiver 140. Block 253 then transfers control to block 254.

In block 254, the measured range $R_m$ and azimuth $Az_m$ from the radar system 110 to the target 120 are recorded in the memory 175. Block 254 then transfers control to block 246 wherein subsequently either the same target 120 or a different target 120 could receive the directed radar signal 190 in block 248.

Figure 2C:
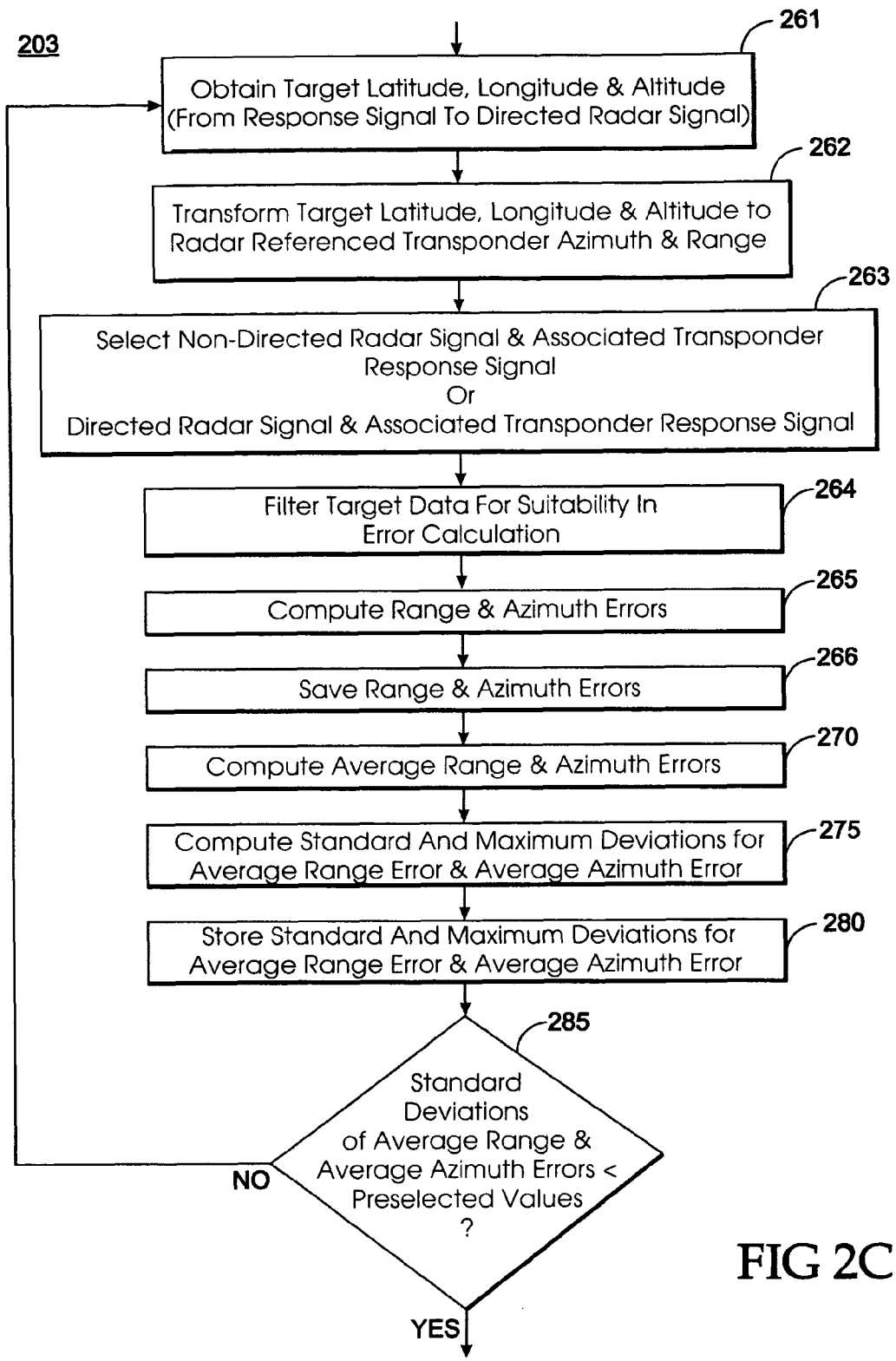
FIG. 2C is a flowchart of a method for the directed mode registration of a radar system using the target of opportunity of FIG. 1.

FIG. 2C is a flowchart of a method 203 for the directed mode registration of a radar system 110 using the target 120 of opportunity of FIG. 1.

In block 261, the latitude, longitude, and altitude of the target 120 are extracted from the transponder response signal 195 (in response to the directed radar signal 190) by the radar system 110 processor 160. Block 261 then transfers control to block 262.

In block 262, the latitude, longitude, and altitude of the target 120 are transformed to radar referenced azimuth and range to the target 120 by the radar system 110 processor 160. The range and azimuth obtained in this process is referred to herein as the computed range $R_c$ and the computed azimuth $Az_c$. A method for performing this transformation will be shown in more detail in the discussion of FIG. 4. Block 262 then transfers control to block 263.

In block 263, a non-directed radar signal 191 and its associated transponder response signal 195 are selected or a directed radar signal 190 and its associated transponder response signal 195 are selected as the source for the radar measured range $R_m$ and azimuth $Az_m$. Block 263 then transfers control to block 264.

In block 264, the target 120 is tested against user-defined filters to determine if it is suitable for use in the error calculation. Filters can include minimum and maximum range/azimuth/altitude, Figure of Merit (FOM), range and azimuth outlier, minimum and maximum velocity, and UTC time sync (for BDS 0,5 only). Targets that fail the filter criteria are discarded. Block 264 then transfers control to block 265.

In block 265, the difference between the computed azimuth $Az_c$ and the measured azimuth $Az_m$ from the radar system 110 to the target 120 are used by the radar system 110 processor 160 to compute an azimuth registration error $Az_b$ which is also referred to herein as an azimuth registration bias error $Az_b$, and the difference between the computed range $R_c$ and the measured range $R_m$ from the radar system 110 to the target 120 are used by the radar system 110 processor 160 to compute a range registration error $R_b$ which is also referred to herein as a range registration bias error $R_b$. Block 265 then transfers control to block 266.

In block 266, the azimuth registration error $Az_b$ and the range registration error $R_b$ obtained in block 265 are stored in the memory 175. Block 266 then transfers control to block 270.

In block 270, average range and azimuth registration errors $R_b, Az_b$ are calculated by averaging the difference between the target's 120 reported position and the radar system 110 measured position for any previous data for the present and other targets 120 used in the process. Block 270 then transfers control to block 275.

In block 275, standard and maximum deviations for average range and azimuth registration errors $R_b, Az_b$ are computed. Block 275 then transfers control to block 280.

In block 280, the standard and maximum deviations for average range and azimuth registration errors $R_b, Az_b$ in block 275 are stored in the memory 175. Block 280 then transfers control to block 285.

If the standard deviations for average range and azimuth registration errors $R_b, Az_b$ obtained in block 275 are less than preselected values, block 285 terminates the process. Otherwise, block 285 transfers control to block 261.

Figure 3:
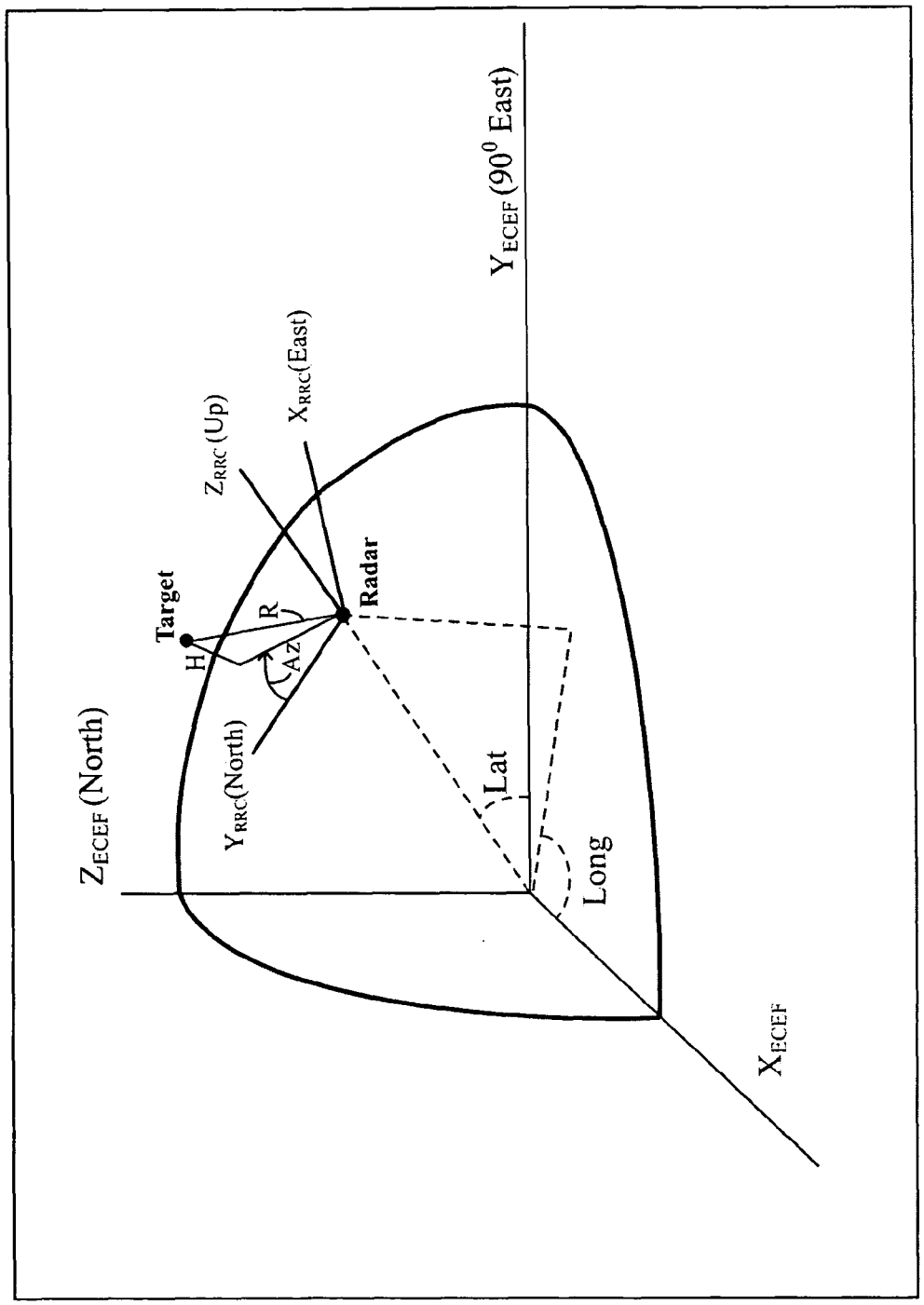
FIG. 3 is a drawing of various coordinate systems used in computing the target range and azimuth obtained from the response signal from the target transponder as described in various representative embodiments.

FIG. 3 is a drawing of various coordinate systems used in computing the target 120 range R and azimuth Az obtained from the transponder response signal 195 from the target 120 transponder 180 as described in various representative embodiments. For each reporting target 120, the registration error is calculated as the difference between the target 120 position as reported by the target 120 (latitude/longitude) and the measured position by the radar system 110 (range/azimuth). Referring to FIG. 3, to calculate this error in a representative embodiment, the target latitude/longitude position is converted to the local radar polar position as follows: (1) the latitude/longitude and altitude data reported by the target 120 are transformed to the geocentric Earth-Centered, Earth-Fixed (ECEF) Cartesian coordinates utilizing the World Geodetic System latest revision WGS-84 ellipsoid Earth model, (2) the ECEF coordinates are converted to local Cartesian radar referenced coordinates, and (3) the local Cartesian radar referenced coordinates are converted to local polar coordinates with the radar system 110 being at the center of the local polar coordinate system.

The ECEF Cartesian coordinate system represents a position as an X, Y, and Z coordinate. The point (0,0,0) denotes the mass center of the earth, and the z-axis is defined as being parallel to the earth rotational axes, pointing towards north. The x-axis intersects the sphere of the earth at 0° latitude and 0° longitude. Thus the ECEF coordinate system rotates with the earth around its z-axis and the ECEF coordinates of a point fixed on the surface of the earth do not change. The World Geodetic System is a standard used in navigation among other areas and comprises a standard coordinate frame for the Earth based on a standard spheroidal reference surface that defines the nominal sea level.

The ECEF coordinate vector $\vec{X}$ is described by the expression of equation (1), $$\vec{X}_{ECEF} = \begin{bmatrix} X_{ECEF} \\ Y_{ECEF} \\ Z_{ECEF} \end{bmatrix} \quad (1)$$

where $$X_{ECEF} = \left(\frac{a}{K} + h\right)\cos(Lat)\cos(Long) \quad (2)$$

$$Y_{ECEF} = \left(\frac{a}{K} + h\right)\cos(Lat)\sin(Long) \quad (3)$$

$$Z_{ECEF} = \left(\frac{a(1-e^2)}{K} + h\right)\sin(Lat) \quad (4)$$

where Lat and Long are the latitude and longitude of the target 120.

In the above equations, a, h, K and $e^2$ are given as:
a=6378137.0 m (earth's semi-major axis, WGS-84)
h=height
$K=\sqrt{1-e^2\sin^2(Lat)}$
$e^2=2f-f^2$ ($1^{st}$ eccentricity squared)
where, $$f = \frac{1}{298.257223563} \quad \text{(earth's flattening, WGS-84)}$$

Using the expressions (2) through (4) above, the target and radar latitude and longitude (Lat and Long) are both converted to ECEF coordinates.

The target data is then converted to Cartesian Radar Referenced Coordinates:

$$\vec{X}_{RRc} = A(\vec{X}_{tgt} - \vec{X}_{radar}) \quad (5)$$

$$\vec{X}_{RRC} = A\Delta\vec{X} \quad (6)$$

where $\vec{X}_{tgt}$ and $\vec{X}_{radar}$ are the ECEF target and radar coordinate calculated in (2) through (4) above. The A matrix is given as:

$$A = \begin{bmatrix} -\sin(Long_R) & \cos(Long_R) & 0 \\ -\sin(Lat_R)\cos(Long_R) & -\sin(Lat_R)\sin(Long_R) & \cos(Lat_R) \\ \cos(Lat_R)\cos(Long_R) & \cos(Lat_R)\sin(Long_R) & \sin(Lat_R) \end{bmatrix} \quad (7)$$

where $Lat_R$ and $Long_R$ are the radar system 110 latitude and longitude.

Simplifying (6) and (7), the RRC target values, $X_{tgt}$, $Y_{tgt}$ and $Z_{tgt}$ are:

$$X_{tgt} = -\Delta X \sin(Long_R) + \Delta Y \cos(Long_R) \quad (8)$$

$$Y_{tgt} = -\Delta X \sin(Lat_R)\cos(Long_R) - \Delta Y \sin(Lat_R)\sin(Long_R) + \Delta Z \cos(Lat_R) \quad (9)$$

$$Z_{tgt} = \Delta X \cos(Lat_R)\cos(Long_R) + \Delta Y \cos(Lat_R)\sin(Long_R) + \Delta Z \sin(Lat_R) \quad (10)$$

where: $\Delta X$, $\Delta Y$ and $\Delta Z$ are the components of the difference vector $\Delta\vec{X}$.

The target range and azimuth can now be calculated from the expression below:

$$R_{tgt} = \sqrt{X^2_{tgt} + Y^2_{tgt} + Z^2_{tgt}} \quad (11)$$

$$Az_{tgt} = \tan^{-1}\left(\frac{X_{tgt}}{Y_{tgt}}\right) \quad (12)$$

The range and azimuth registration errors are calculated by averaging the difference between the targets reported position and the radar measured position for all N targets used in the process as in equations (13) and (14).

$$R_{reg} = \frac{1}{N}\sum_N (R_{tgt} - R_{measured}) \quad (13)$$

$$Az_{reg} = \frac{1}{N}\sum_N (Az_{tgt} - Az_{measured}) \quad (14)$$

As more data is collected, the registration error, due to the averaging process, becomes more accurate. A count of the number of plots used for the registration process as well as a standard deviation value can be used for registration quality and for determining when to terminate an automatic registration process.

For proper registration, the aircraft position at the time the radar data is collected should be known to the best possible accuracy. Unfortunately, this may not be the case (i.e. INS drift, reporting time delay, poor GPS FOM). However, unlike the case of a PARROT where data is provided by a single source, the targets of opportunity provide multiple data sources having their errors randomly spread over time and space. Thus, the data reported by the different targets can be averaged and the bias error can be extracted to the required accuracy.

Figure 4:
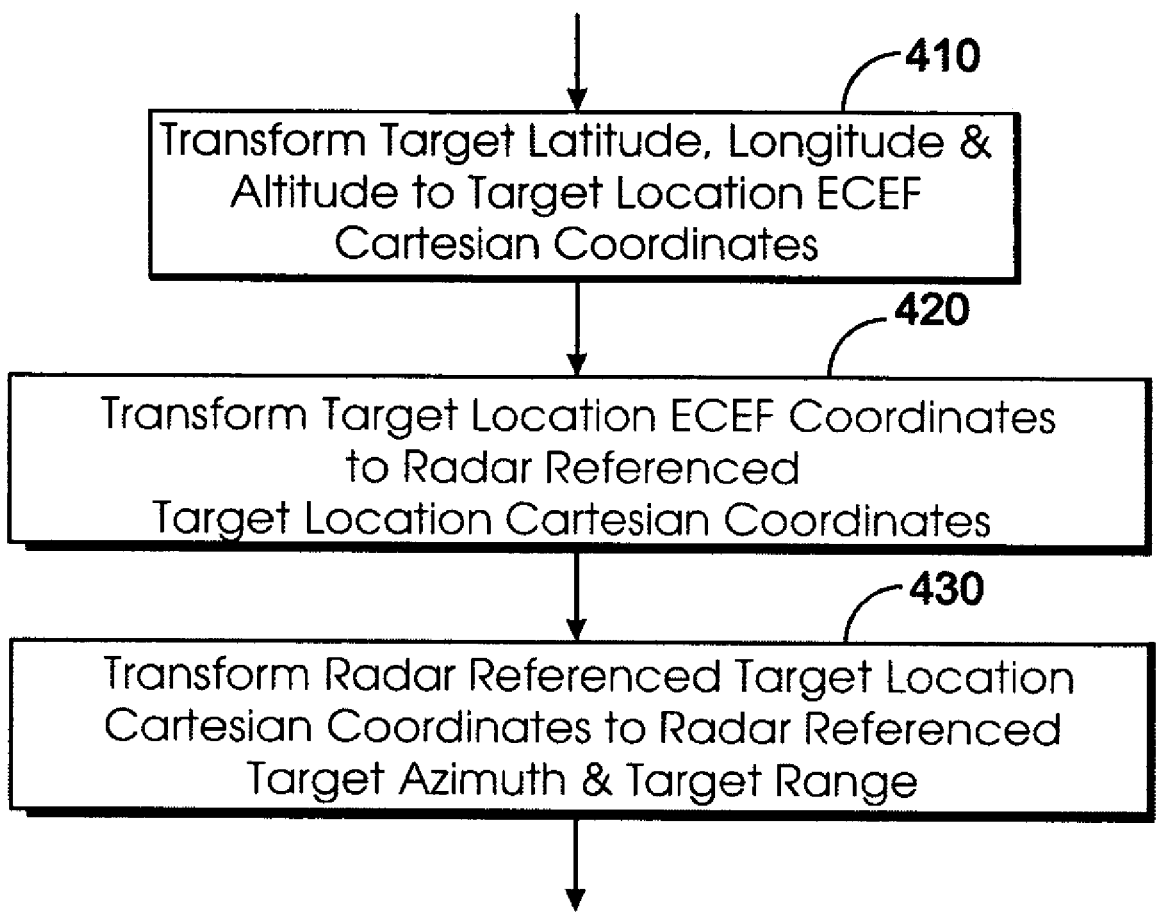
FIG. 4 is a flowchart of a method for transforming the target range and azimuth as described in various representative embodiments.

FIG. 4 is a flowchart of a method 400 for transforming the target range and azimuth as described in various representative embodiments. In a representative embodiment, the steps of FIG. 4 replace block 262 of FIG. 2C. In the case of FIG. 2C, once block 261 of FIG. 2C has completed obtaining target 120 latitude, longitude and altitude, block 261 transfers control to block 410 of FIG. 4. In block 410 of FIG. 4, the target 120 latitude, longitude and altitude information contained in the transponder response signal 195 are transformed in a representative embodiment to target 120 location ECEF Cartesian coordinates wherein ECEF Cartesian coordinates are the geocentric Earth-Centered, Earth-Fixed (ECEF) Cartesian coordinates utilizing the World Geodetic System latest revision WGS-84 ellipsoid Earth model. Block 410 then transfers control to block 420.

In block 420, the ECEF coordinates are converted to local Cartesian radar referenced coordinates. Block 420 then transfers control to block 430.

In block 430, the local Cartesian radar referenced coordinates are converted to local polar coordinates with the radar system 110 being at the center of the local polar coordinate system. In the representative embodiment wherein the steps of FIG. 4 replace block 262 of FIG. 2C, block 430 then transfers control to block 263 of FIG. 2C.

Figure 5:
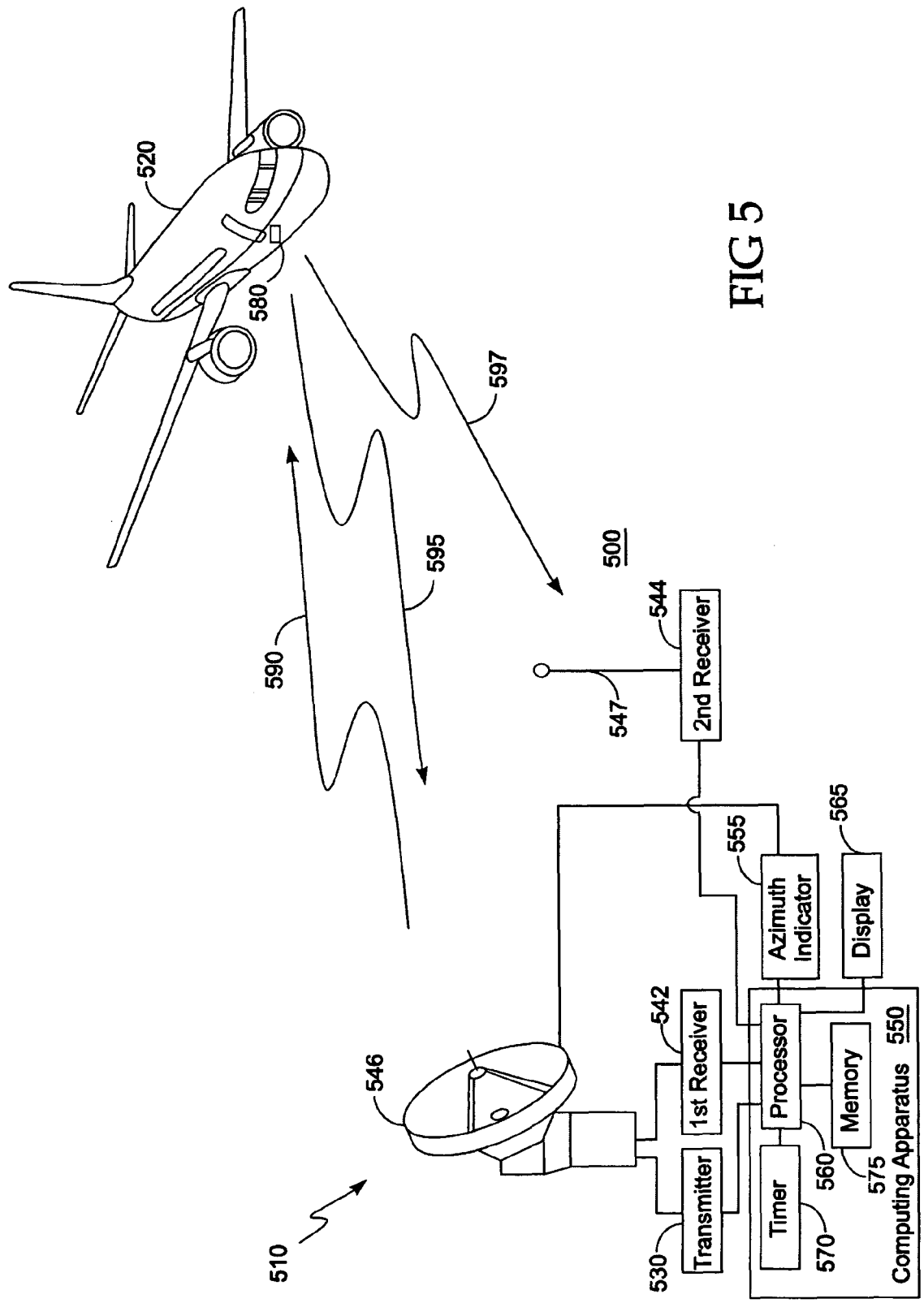
FIG. 5 is a drawing of a registration system for an asynchronous mode registration of a radar system using a target of opportunity as described in various representative embodiments.

FIG. 5 is a drawing of a registration system 500 for an asynchronous mode registration of a radar system 510 using a target 520 of opportunity as described in various representative embodiments. In FIG. 5, the registration system 500 comprises the radar system 510 and the target 520 of opportunity. The radar system 510 comprises a transmitter 530, a first receiver 542, a second receiver 544, a first antenna 546, a second antenna 547, a computing apparatus 550, an azimuth indicator 555 and a display 565. The computing apparatus 550 comprises a processor 560, a timer 570 and a memory 575. The target 520 of opportunity comprises a transponder 580. In the representative embodiment of FIG. 5, the first antenna 546 is coupled to the transmitter 530, the first receiver 542 and to the azimuth indicator 555, and the second antenna 547 which is preferably an Omni antenna 547 is coupled to the second receiver 544. The transmitter 130 is further coupled to the processor 560; the first receiver 542 is further coupled to the processor 560; the second receiver 544 is further coupled to the processor 560; and the processor 560 is further coupled to the azimuth indicator 555, to the timer 570, to the memory 575 and to the display 565.

In operation, the transmitter 530 of the radar system 510 transmits non-directed radar signals 590 via the first antenna 546 which is received by the transponder 580 located on the target 520. The transponder 580 then transmits transponder response signals 595 which are detected by the first receiver 542 via the first antenna 546. The timer 570 records the times the non-directed radar signals 590 are transmitted and the times the transponder response signals 595 are received by the first receiver 542 of the radar system 510. Ranges to the target 520 are measured by the processor 560 based on the times the non-directed radar signals 590 were transmitted by the transmitter 530 and the times the transponder response signals 595 were received by the first receiver 542. Azimuths to the target are measured by knowing the azimuths at which the first antenna 546 is pointing at the times that the transponder response signals 595 are received by the first receiver 542. The transponder 580 transmits a transponder asynchronous signal 597 which is detected by the second receiver 544 via the second antenna 547. The transponder asynchronous signal 597 is correlated to the transponder response signal 595 using the Mode S address of the target 520. Target 520 reported values for the range and azimuth to the target 520 relative to the radar system 510 are obtained from computations based on information received in the transponder asynchronous signal 597 from the target 520. Information (latitude, longitude, and altitude of the target 520) received in the transponder asynchronous signal 597 can comprise Global Positioning System (GPS) location information, inertial navigation system (INS) location information, and/or other appropriate location information for the target 520. The target 520 reported latitude/longitude and altitude geographical data is converted to radar referenced Cartesian coordinates. The Cartesian coordinates are then propagated to the latest transponder response signal 595 time and converted to radar polar coordinates. The error between the measured (range and azimuth) and target 520 reported (latitude/longitude) positions can then be calculated and registration correction values for range and azimuth for the radar system 510 extracted. Range and azimuth values compensated respectively by the range and azimuth error bias values and/or target 520 location relative to the radar system 510 can be displayed on the display 565.

In the Automatic Dependent Surveillance Broadcast (ADS-B) Extended Squitter mode, target position data is transferred to the transponder 580 from its on-board GPS/INS system. The transponder 580 asynchronously broadcasts its position and Mode S identification code twice per second. An ADS-B ground station receiver, utilizing an OMNI directional antenna, receives the ADS-B data and passes it to the MSSR where it is used to identify targets 520 in the surveillance volume. ADS-B is a cooperative surveillance technique for air traffic control. An ADS-B-equipped target (aircraft) 520 determines its own position using GPS obtained information and periodically broadcasts this position and other relevant information to potential ground stations and other aircraft with ADS-B equipment without knowing what other aircraft or entities may receive it. ADS-B can be used over several different data link technologies, including Mode-S Extended Squitter (1090 ES) operating at 1090 MHz, Universal Access Transceiver (978 MHz UAT), and VHF data link (VDL Mode 4).

By adding an ADS-B receiver to the MSSR, target responses to SIF/Mode S surveillance interrogations will be augmented by the asynchronous Mode S ADS-B reports. The target 520 latitude, longitude and altitude along with the Mode S target 520 address as received by the ADS-B receiver are merged with the SSR data, to generate an integrated target 520 track report. The integrated message contains two independent position reports, the range and azimuth measured from the SSR reply and the ADS-B latitude, longitude and altitude data. However, both data sources may be erroneous. The SSR data may contain registration bias errors and random measurement errors. The ADS-B data, due to lack of GPS data, INS drift, and/or latency in reporting, may point to an incorrect target position. However, by proper data propagation to a common time and integration of multiple target 520 samples, the random errors may be averaged and the bias error can be extracted to the accuracy required.

Once a target 520 plot report is detected by the SSR interrogation, it is associated with its corresponding track. The ADS-B data is converted from Latitude and Longitude to Cartesian coordinates and is propagated to the latest SSR plot time. The data is then converted to radar polar coordinates where it is compared to the radar system 510 measured position. This comparison yields separate range and azimuth error estimates. These estimates are averaged over time providing increasingly accurate range and azimuth.

The ADS-B Extended Squitter message is 112 bits long and contains 56 bits of ADS position information along with the 24-bit aircraft address. The content of the ADS field can be one of six types: (1) Airborne position (transmitted when airborne)—BDS 0,5; (2) Surface position (transmitted when on airport surface)—BDS 0,6; (3) Extended Squitter Status, BDS 0,7; (4) Extended Squitter Aircraft Identification and Type, BDS 0,8; (5) Airborne Velocity, BDS 0,9 (there are 4 sub-types of this report—2 subsonic and 2 supersonic); and (6) Event driven Information, BDS 0,A. which is not presently used. In a representative embodiment, the Airborne position format BDS 0.5 is shown in Table 2.

The availability of ADS-B data depends upon the ADS-B receiver system used and the target load. In a representative embodiment, an OMNI antenna provides approximately 9 dB of gain and uses a simple receiver having a minimum trigger level (MTL) of approximately −80 dBm. This ADS-B receiver system can provide a conservative maximum detection range of approximately 50 to 100 NM. In another representative embodiment, a Sector antenna containing 6 to 12 antennas each having approximately 14 dB gain and an improved receiver having an MTL of approximately −87 dBm can provide a maximum detection range of approximately 200 NM. A typical link budget showing the gains and losses for a specified transmission/reception path and a final margin is shown in Table 4.

TABLE 4

Link Budget for OMNI and Sector antenna

| Item | OMNI (50 NM) | Sector (200 NM) |
|---|---|---|
| Aircraft transmitted power(dBm) | 57 | 57 |
| Transmitter cable losses(dB) | −3 | −3 |
| Transmitter Antenna gain(dBi) | 0 | 0 |
| Path loss at 1090 MHz(dB) | −132.5 | −144.5 |
| Receiver antenna gain(dBi) | 9 | 14 |
| Receiver losses(dB) | −2 | −2 |
| Received power(dBm) | −71.5 | −78.5 |
| MTL(dBm) | −80 | −87 |
| Link margin(dB) | 8.5 | 8.5 |

Although the ADS-B broadcast report rate is 2 per second, the number of reports detected by the Omni antenna/receiver may be significantly less due to the level of Selective Identification Feature (SIF) and Mode S False Replies Unsynchronized In Time (FRUIT). In a typical application, the number of ADS-B decoded reports can range from approximately 1 report every 10 seconds under high target load conditions to 2 reports every 1 second under low target load conditions.

Figure 6:
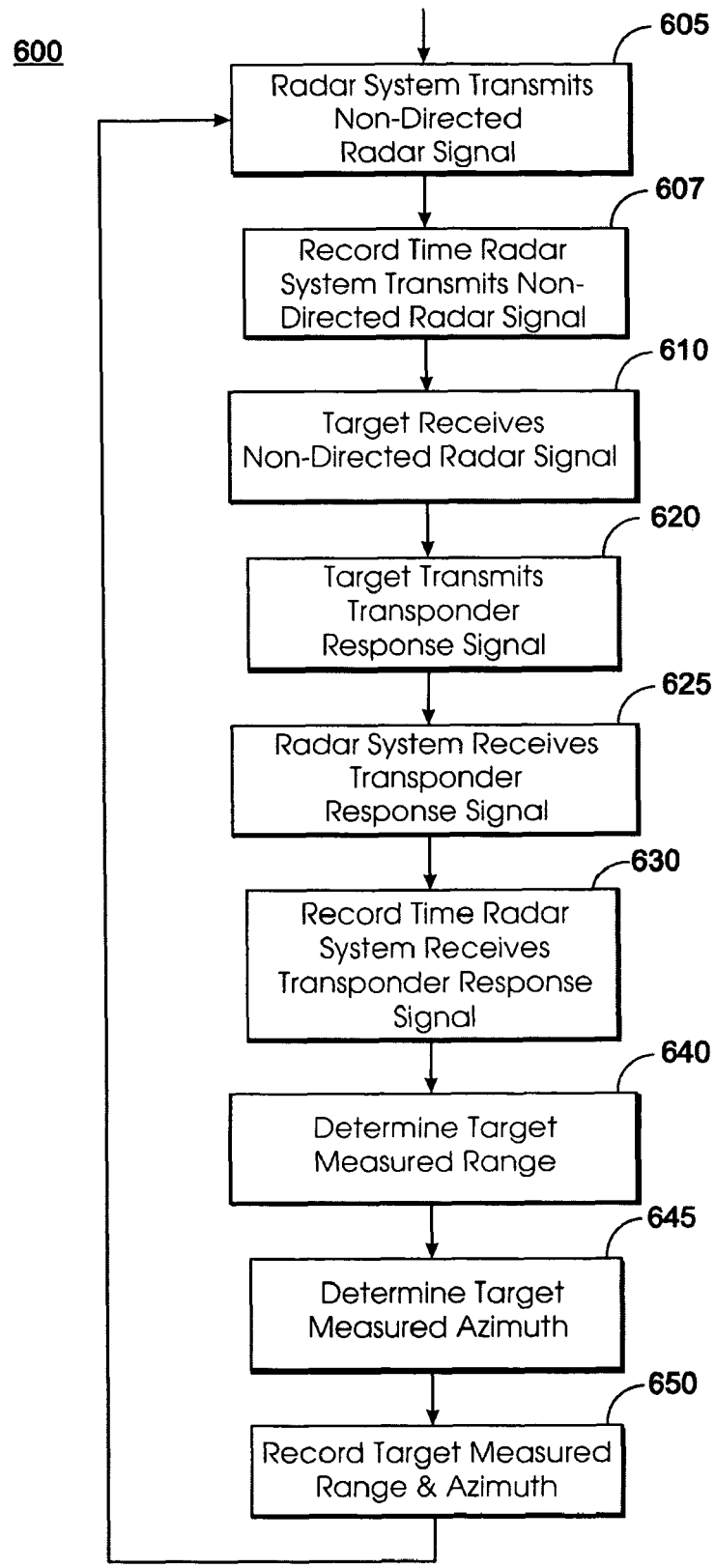
FIG. 6 is a flowchart of a method for obtaining measured range and azimuth data for the asynchronous mode registration of a radar system using the target of opportunity of FIG. 5.

FIG. 6 is a flowchart of a method 600 for obtaining measured range $R_m$ and azimuth $Az_m$ data for the asynchronous mode registration of a radar system 510 using the target 520 of opportunity of FIG. 5. In block 605, of FIG. 6, the radar system 510 transmits a non-directed radar signal 590. Block 605 then transfers control to block 607.

In block 607, the time that the non-directed radar signal 590 is transmitted is recorded in the memory 575. Block 607 then transfers control to block 610.

In block 610, assuming that the target is within range of the non-directed radar signal 590, the target 520 receives the non-directed radar signal 590. Block 610 then transfers control to block 620.

In block 620, the transponder 580 in the target 520 transmits a transponder response signal 595. Block 620 then transfers control to block 625.

In block 625, the second receiver 544 of the radar system 510 receives the transponder response signal 595. Block 625 then transfers control to block 630.

In block 630, the time that the first receiver 542 of the radar system 510 receives the transponder response signal 595 is recorded in the memory 575. Block 630 then transfers control to block 640.

In block 640, the time that the non-directed radar signal 590 is transmitted and the time that the transponder response signal 595 is received by the radar system 510 first receiver 542 are used to determine a target 520 measured range $R_m$. Block 640 then transfers control to block 645.

In block 645, a measured azimuth $Az_m$ from the radar system 510 to the target 520 is obtained from the direction in which the first antenna 546 of the radar system 510 is pointing at the time that the transponder response signal 595 is received by the radar system 510 first receiver 542. Block 645 then transfers control to block 650.

In block 650, the target 520 measured range $R_m$ and azimuth $Az_m$ are recorded in the memory 575. Block 650 then transfers control to block 605 wherein subsequently either the same target 520 or a different target 520 could receive the non-directed radar signal 590 in block 610.

FIG. 7 is a flowchart of a method 700 for the asynchronous mode registration of a radar system 510 using the target 520 of opportunity of FIG. 5. In block 755 of FIG. 7, the radar system 510 receives a transponder asynchronous signal 597 transmitted by a transponder 580 in the target 520. Block 755 then transfers control to block 757.

In block 757, the transponder asynchronous signal 597 is correlated to the closest in time transponder response signal 595 using the Mode S address of the target 520. Block 757 then transfers control to block 760.

In block 760, the latitude, longitude, and altitude of the target 520 is extracted from the transponder asynchronous signal 597 by the radar system 510 processor 560. Block 760 then transfers control to block 763.

In block 763, the latitude, longitude, and altitude of the target 520 extracted from the transponder asynchronous signal 597 is transformed to radar system 510 referenced target Cartesian coordinates. In a representative embodiment, the target 520 latitude, longitude and altitude information could be transformed to the target 520 location ECEF Cartesian coordinates wherein ECEF Cartesian coordinates are the geocentric Earth-Centered, Earth-Fixed (ECEF) Cartesian coordinates utilizing the World Geodetic System latest revision WGS-84 ellipsoid Earth model. The ECEF coordinates can then be converted to local Cartesian radar system 510 referenced coordinates. Block 763 then transfers control to block 765.

In block 765, the radar system 510 referenced target Cartesian coordinates are propagated to their projected coordinates at the closest time of a transponder response signal 595. Block 765 then transfers control to block 767.

In block 767, the radar system 510 referenced projected target Cartesian coordinates are converted to radar system 510 referenced target 520 computed range and azimuth. Block 767 then transfers control to block 770.

In block 770, the target 520 information is tested against user-defined filters to determine if it is suitable for use in the error calculation. Filters can include minimum and maximum range/azimuth/altitude, Figure of Merit (FOM), range and azimuth outlier, minimum and maximum velocity, and UTC time sync. Targets 520 that fail the filter criteria are discarded. Block 770 then transfers control to block 775.

In block 775, the difference between the radar system 510 referenced target 520 computed range $R_c$ and the measured range $R_m$ from the radar system 510 to the target 520 are used by the radar system 510 processor 560 to compute a range registration error $R_b$, and the difference between the radar system 510 referenced target 520 computed azimuth $Az_m$ and the measured azimuth $Az_m$ from the radar system 510 to the target 520 are used by the radar system 510 processor 560 to compute an azimuth registration error $Az_b$. Block 775 then transfers control to block 780.

In block 780, the range registration error $R_b$ and the azimuth registration error $Az_b$ obtained in block 775 are stored in the memory 575. Block 780 then transfers control to block 785.

In block 785, average range and azimuth registration errors $R_b$, $Az_b$ are calculated using any previous data for the present and other targets 520 used in the process. Block 785 then transfers control to block 790.

In block 790, standard and maximum deviations for average range and azimuth registration errors $R_b, Az_b$ are computed. Block 790 then transfers control to block 793.

In block 793, the standard and maximum deviations for average range and azimuth registration errors $R_b, Az_b$ are stored in the memory 575. Block 793 then transfers control to block 795.

If the standard deviations for average range and azimuth registration errors $R_b, Az_b$ obtained in block 790 are less than preselected values, block 795 terminates the process. Otherwise, block 795 transfers control to block 755.

Figure 8:
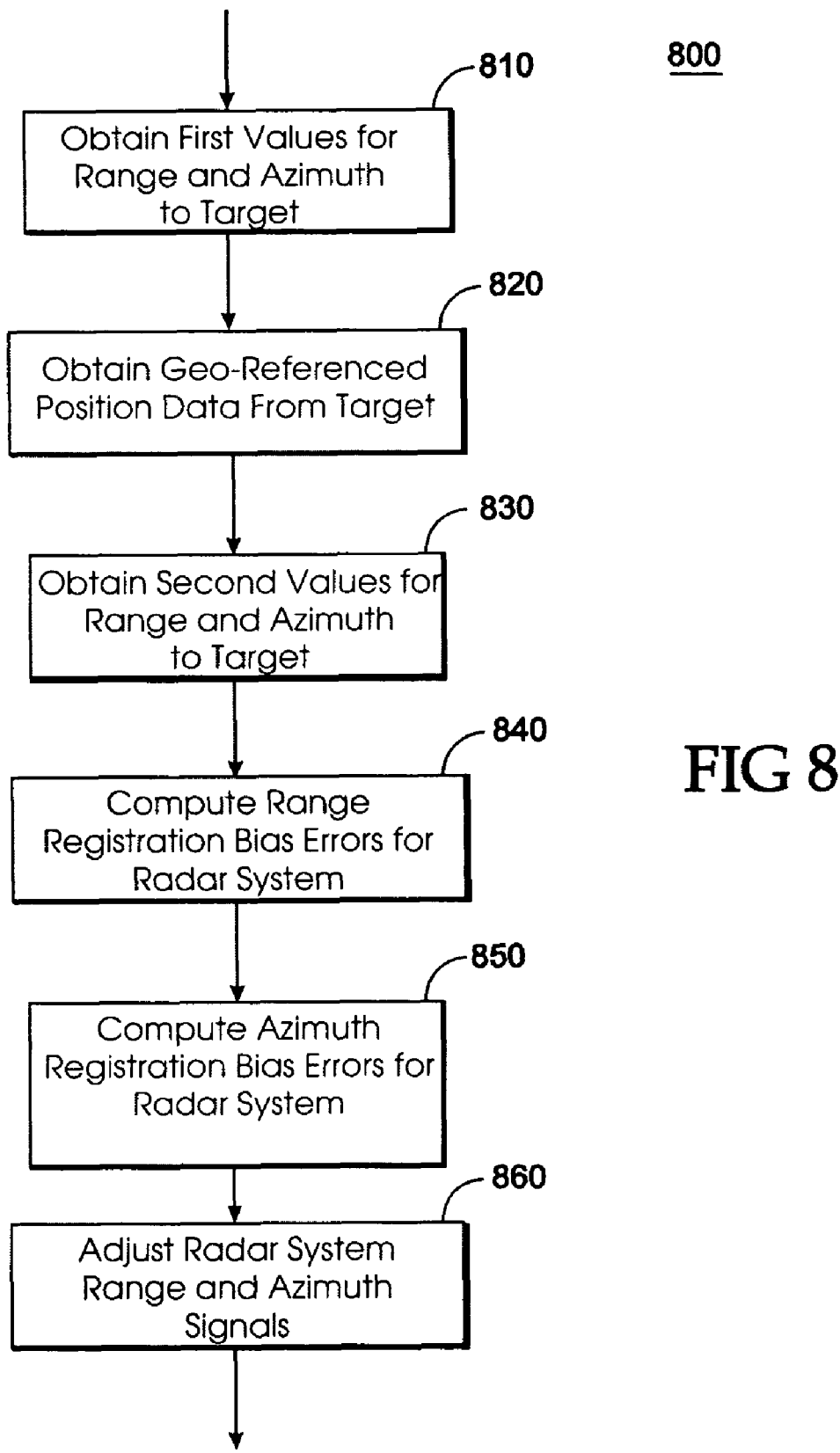
FIG. 8 is a flowchart of a method for registering a radar system as described in various representative embodiments.

FIG. 8 is a flowchart of a method 800 for registering a radar system 110,510 as described in various representative embodiments. In block 810 of FIG. 8, first values for a range and an azimuth from the radar system 110,510 to a target 120,520 are obtained using radar system 110,510 initiated signals 190,195,590,595. Block 810 then transfers control to block 820.

In block 820, geo-referenced position data is obtained from the target 120,520. Block 820 then transfers control to block 830.

In block 830, second values for the range and the azimuth from the radar system 110,510 to the target 120,520 are obtained using the geo-referenced position data. Block 830 then transfers control to block 840.

In block 840, a range registration bias error for the radar system 110,510 is computed using the difference between the first and second values for the range. Block 840 then transfers control to block 850.

In block 850, an azimuth registration bias error for the radar system 110,510 is computed using the difference between the first and second values for the azimuth. Block 850 then transfers control to block 860.

In block 860, range and azimuth readings are adjusted in accordance with the range and azimuth registration bias errors.

In the above disclosed techniques the target 120,520 could be an aircraft and the radar registration system 100,500 could be used in an air traffic control system. While the above representative embodiment has been described in terms of using Mode S targets of opportunity for the registration of monopulse secondary surveillance radars (MSSR) either through a directed interrogation or via an Automatic Dependent Surveillance Broadcast (ADS-B), it will be understood by one of ordinary skill in the art that other representative embodiments can be implemented using these techniques with different technologies.

In a representative embodiment, a method 800 for registering a radar system 110,510 is disclosed. The method 800 comprises obtaining first values for a location of a target 120,520 relative to the radar system 110,510 using radar system 110,510 initiated signals 190,191,195,590,595, obtaining geo-referenced location data for and from the target 120,520, obtaining second values for the location of the target 120,520 relative to the radar system 110,510 using the geo-referenced location data, computing location registration bias errors for the radar system 110,510 using the first and second values, and registering the radar system 110,510 using the computed location registration bias errors.

In another representative embodiment, a registration system 100,500 for registering a radar system 110,510 is disclosed. The registration system 100,500 comprises the radar system 110,510, The radar system 110,510 is capable of measuring first values for a location of a target 120,520 relative to the radar system 110,510 using radar system 110,510 initiated signals 190,191,195,590,595, receiving geo-referenced location data for and from the target 120,520, computing second values for the location of the target 120,520 relative to the radar system 110,510 using the geo-referenced location data, computing location registration bias errors for the radar system 110,510 using the first and second values, and registering the radar system 110,510 using the computed location registration bias errors.

In still another representative embodiment, a radar registration system is disclosed. The radar registration system comprises a radar operable to output radar data including a plurality of radar-based position reports associated with one or more targets moving within a range of the radar, a geo-referenced position source operable to output a plurality of geo-referenced position reports associated with the one or more targets, and a processor operable to compute position bias parameters associated with the radar by analyzing the radar-based position reports using the geo-referenced position reports as a reference.

In yet another representative embodiment, a method of registering a radar is disclosed. The method comprises collecting a plurality of radar data samples from the radar, the radar data samples comprising radar-based position reports associated with one or more targets moving within range of the radar, collecting a plurality of geo-referenced data samples from a geo-referenced position source, the geo-referenced data samples comprising geo-referenced position reports associated with the one or more targets, and computing position bias parameters associated with the radar by analyzing the radar-based position reports using the geo-referenced position reports as a reference.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for registering a radar system, comprising:
    obtaining first values for a location of a target relative to the radar system using radar system initiated signals;
    obtaining geo-referenced location data for and from the target;
    obtaining second values for the location of the target relative to the radar system using the geo-referenced location data;
    computing location registration bias errors for the radar system using the first and second values; and
    registering the radar system using the computed location registration bias errors.

2. The method as recited in claim 1, wherein the geo-referenced location data for the target comprises latitude, longitude and altitude of the target.

3. The method as recited in claim 1,
    wherein the first values comprise values for a measured range and a measured azimuth from the radar system to the target located on a set of orthogonal coordinates,
    wherein the second values comprise values for a computed range and a computed azimuth from the radar system to the target located on the orthogonal coordinates, and
    wherein the location registration bias errors for the radar system comprise a range registration bias error and an azimuth registration bias error.

4. The method as recited in claim 3,
    wherein the radar system initiated signals comprise a directed radar signal transmitted from the radar system and a transponder response signal transmitted by the target, wherein the directed radar signal comprises instructions to the target to which it is directed to respond with the transponder response signal when the target receives the directed radar signal, and wherein the transponder response signal comprises the geo-referenced location data for the target.

5. The method as recited in claim 4, wherein the radar system initiated signals further comprise a non-directed radar signal, wherein the non-directed radar signal includes instructions to the target(s) that receive the signal to respond with the transponder response signal, and wherein the non-directed radar signal is not addressed specifically to the target.

6. The method as recited in claim 5, further comprising:

selecting the directed radar signal and its associated transponder response signal as the source for the radar measured range and azimuth or selecting the non-directed radar signal and its associated transponder response signal as the source for the radar measured range and azimuth.

7. The method as recited in claim 6, further comprising:

extracting the geo-referenced location data for the target from the transponder response signal transmitted by a transponder in response to the directed radar signal, transforming the geo-referenced location data for the target to radar referenced coordinates;

computing a computed range and a computed azimuth using the transformed geo-referenced location data for the target;

computing a range registration bias error using the computed range and the measured range; and computing an azimuth registration bias error using the computed azimuth and the measured azimuth.

8. The method as recited in claim 7, further comprising:

computing an average range registration bias error using the computed range registration bias error and other previously computed range registration bias errors; and computing an average azimuth registration bias error using the computed azimuth registration bias error and other previously computed azimuth registration bias errors.

9. The method as recited in claim 8, further comprising:

registering the radar system using the average range registration bias error and the average azimuth registration bias error.

10. The method as recited in claim 8, further comprising:

computing a figure of merit for the range registration bias error and the azimuth registration bias error; and if the computed figure of merit does not meet preselected criteria, repeating the above method steps.

11. The method as recited in claim 3, wherein the radar system initiated signals comprise a non-directed radar signal transmitted from the radar system and a transponder response signal transmitted by the target, wherein the non-directed radar signal comprises instructions to the target to respond with the transponder response signal when the target receives the non-directed radar signal, wherein a transponder asynchronous signal comprises the geo-referenced location data for the target, and wherein the non-directed radar signal is not addressed specifically to the target.

12. The method as recited in claim 11, further comprising:

selecting the non-directed radar signal and its associated transponder response signal are selected as the source for the radar measured range and azimuth;

extracting the geo-referenced location data for the target from the transponder asynchronous signal transmitted by a transponder asynchronously;

correlating the asynchronous transponder signal with the closest in time transponder response signal;

transforming the geo-referenced location data for the target to radar referenced coordinates;

computing a computed range and a computed azimuth using the transformed geo-referenced location data for the target;

computing a range registration bias error using the computed range and the measured range; and computing an azimuth registration bias error using the computed azimuth and the measured azimuth.

13. The method as recited in claim 12, further comprising:

computing an average range registration bias error using the computed range registration bias error and other previously computed range registration bias errors; and computing an average azimuth registration bias error using the computed azimuth registration bias error and other previously computed azimuth registration bias errors.

14. The method as recited in claim 13, further comprising:

registering the radar system using the average range registration bias error and the average azimuth registration bias error.

15. The method as recited in claim 13, further comprising:

computing a figure of merit for the range registration bias error and the azimuth registration bias error; and if the computed figure of merit does not meet preselected criteria, repeating the above method steps.

16. A registration system for registering a radar system, comprising:

the radar system, wherein the radar system is capable of measuring first values for a location of a target relative to the radar system using radar system initiated signals, wherein the radar system is capable of receiving geo-referenced location data for and from the target, wherein the radar system is capable of computing second values for the location of the target relative to the radar system using the geo-referenced location data, wherein the radar system is capable of computing location registration bias errors for the radar system using the first and second values, and wherein the registration system is capable of registering the radar system using the computed location registration bias errors.

17. The registration system as recited in claim 16, wherein the geo-referenced location data for the target comprises latitude, longitude and altitude of the target.

18. The registration system as recited in claim 16, wherein the first values comprise values for a measured range and a measured azimuth from the radar system to the target located on a set of orthogonal coordinates, wherein the second values comprise values for a computed range and a computed azimuth from the radar system to the target located on the orthogonal coordinates, and wherein the location registration bias errors for the radar system comprise a range registration bias error and an azimuth registration bias error.

19. The registration system as recited in claim 18, wherein the radar system initiated signals comprise a directed radar signal transmitted from the radar system and a transponder response signal transmitted by the target, wherein the directed radar signal comprises instructions to the target to which it is directed to respond with the transponder response signal when the target receives the directed radar signal, and wherein the transponder response signal comprises the geo-referenced location data for the target.

20. The registration system as recited in claim 19, wherein the radar system initiated signals further comprise a non-directed radar signal, wherein the non-directed radar signal includes instructions to the target(s) that receive the signal to respond with the transponder response signal and wherein the non-directed radar signal is not addressed specifically to the target.

21. The registration system as recited in claim 20, wherein the directed radar signal and its associated transponder response signal are selected as the source for the radar measured range and azimuth or the non-directed radar signal and its associated transponder response signal are selected as the source for the radar measured range and azimuth, wherein the radar system is capable of extracting the geo-referenced location data for the target from the transponder response signal transmitted by a transponder in response to the directed radar signal, wherein the radar system is capable of transforming the geo-referenced location data for the target to radar referenced coordinates, wherein the radar system is capable of computing a computed range and a computed azimuth using the transformed geo-referenced location data for the target, wherein the radar system is capable of computing a range registration bias error using the computed range and the measured range and wherein the radar system is capable of computing an azimuth registration bias error using the computed azimuth and the measured azimuth.

22. The registration system as recited in claim 18, wherein the radar system initiated signals comprise a non-directed radar signal transmitted from the radar system and a transponder response signal transmitted by the target, wherein the non-directed radar signal comprises instructions to the target to respond with the transponder response signal when the target receives the non-directed radar signal, wherein a transponder asynchronous signal comprises the geo-referenced location data for the target, and wherein the non-directed radar signal is not addressed specifically to the target.

23. The registration system as recited in claim 22, wherein the non-directed radar signal and its associated transponder response signal are selected as the source for the radar measured range and azimuth, wherein the radar system is capable of correlating the asynchronous transponder signal with the closest in time transponder response signal, wherein the radar system is capable of extracting the geo-referenced location data for the target from the transponder asynchronous signal transmitted by a transponder asynchronously, wherein the radar system is capable of transforming the geo-referenced location data for the target to radar referenced coordinates, wherein the radar system is capable of computing a computed range and a computed azimuth using the transformed geo-referenced location data for the target, wherein the radar system is capable of computing a range registration bias error using the computed range and the measured range, and wherein the radar system is capable of computing an azimuth registration bias error using the computed azimuth and the measured azimuth.

24. A radar registration system comprising:

a radar operable to output radar data including a plurality of radar-based position reports associated with one or more targets moving within a range of the radar;

a geo-referenced position source operable to output a plurality of geo-referenced position reports associated with the one or more targets; and a processor operable to compute position bias parameters associated with the radar by analyzing the radar-based position reports using the geo-referenced position reports as a reference.

25. The system of claim 24 wherein the position bias parameters comprise a range bias and an azimuth bias that are orthogonal to one another.

26. The system of claim 24 wherein the processor is included within an air traffic control system.

27. The system of claim 24 wherein said processor is further operable to perform quality monitoring during computation of the position and time bias parameters to provide an estimate of the quality of the position bias parameters.

28. A method of registering a radar, said method comprising:

collecting a plurality of radar data samples from the radar, the radar data samples comprising radar-based position reports associated with one or more targets moving within range of the radar;

collecting a plurality of geo-referenced data samples from a geo-referenced position source, the geo-referenced data samples comprising geo-referenced position reports associated with the one or more targets; and computing position bias parameters associated with the radar by analyzing the radar-based position reports using the geo-referenced position reports as a reference.

29. The method of claim 28 wherein in said step of computing position bias parameters, the position bias parameters comprise a range bias and an azimuth bias that are orthogonal to one another.

30. The method of claim 28 wherein said step of computing position bias parameters, computation of the position and time bias parameters occurs on a processor within an air traffic control system.

31. The method of claim 28 further comprising the step of:

performing a quality monitoring during computation of the position bias parameters to provide an estimate of the quality of the position bias parameters.

* * * * *